L. W. MANUEL.
PROCESS OF PRESERVING FISH, FOWL, AND FLESH.
APPLICATION FILED NOV. 17, 1917.

1,289,850. Patented Dec. 31, 1918.

WITNESSES
Edw. Thorpe

INVENTOR
L.W. Manuel
BY
ATTORNEYS

UNITED STATES PATENT OFFICE.

L W. MANUEL, OF JACKSONVILLE, FLORIDA, ASSIGNOR, BY DIRECT AND MESNE ASSIGNMENTS, TO ATLANTIC DEALERS AND DEVELOPMENT COMPANY, OF JACKSONVILE, FLORIDA, A CORPORATION OF FLORIDA.

PROCESS OF PRESERVING FISH, FOWL, AND FLESH.

1,289,850.     Specification of Letters Patent.     Patented Dec. 31, 1918.

Application filed November 17, 1917. Serial No. 202,496.

*To all whom it may concern:*

Be it known that I, L W. MANUEL, a citizen of the United States, and a resident of Jacksonville, in the county of Duval and State of Florida, have invented certain new and useful Improvements in Processes of Preserving Fish, Fowl, and Flesh, of which the following is a full, clear, and exact description.

The present invention relates to preserving fish, fowl and meats of all kinds for food purposes, and more particularly to what might be called a "dry cure" process, and it has for its object the treatment of flesh foods in such manner that the flavor thereof will be preserved and the food value retained for an indefinite period.

Heretofore it has been common to smoke fish and meats in preserving them for food, but in that process there is imparted to the fish and meat a smoky taste which is objectionable to many people. In preserving fish it has also been common to make use of salt and the action of the air in the so-called "dry cure" salt process. It is also common to use a salt brine in preserving fish and meats in the so-called "wet cure" process. In these processes however, a relatively large amount of salt is required and it follows that before the fish or flesh thus treated can be rendered palatable, it must be subjected to either soaking or parboiling processes for the purpose of removing the excess salt therein. In all the processes heretofore used, especially in the preservation of fish, it has been considered extremely difficult, if not practically impossible, to preserve the fats for any considerable length of time.

The object of the present invention is to produce a preservative process which, when utilized for the preservation of fish, fowl and flesh for food purposes, shall minimize the amount of salt required, and which while effectually maintaining the article in a condition suitable for food for any length of time, will at the same time retain in a large degree the natural flavor and do away entirely with any smoky or excessive salty flavor.

Figure 1:
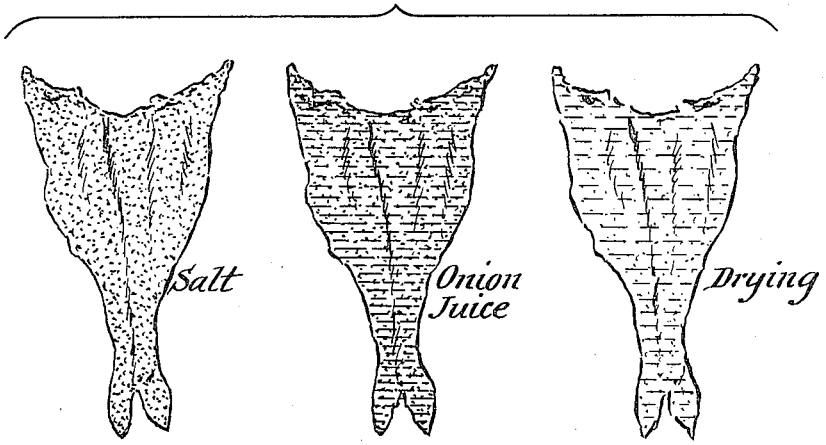

To the above ends, my invention consists of the improved process which will be hereinafter described and claimed and of an article of food, consisting of either fish, fowl or flesh, treated and preserved by such process. My invention is shown in the accompanying drawing in which in Figure 1 there is illustrated diagrammatically the various steps of my process.

Figure 2:
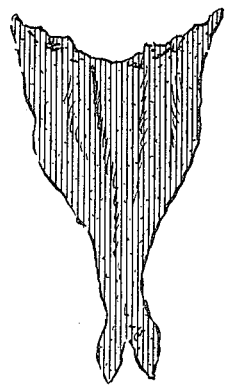

Fig. 2 shows a fish which has been preserved by my process.

In carrying out my process, for instance, in treating a fish, it is first thoroughly cleaned and split and opened flat as shown in Fig. 2. It is then treated with salt which may be sprinkled thereon, or it may be dipped in salt and the excess salt shaken and brushed off. The salted fish is then coated with onion juice or garlic juice and then placed on suitable driers exposed to the atmosphere for a sufficient length of time to dry, or it may be dried artificially by subjecting it to the action of relatively high temperature, not sufficient however, to injuriously affect the tissues. I have also carried out my process by dipping the thoroughly cleansed fish into a strong saline solution and thereafter applying thereto a coating of onion or garlic juice, and I have obtained good results by making a compound solution of salt water and onion or garlic juice. The onion or garlic juice may be produced by grating, shredding and pressing the juice therefrom, and I have also produced a distillation of onion and garlic juice and water which I have found to be effective when combined with the saline treatment herein described. I have obtained good results by using the following proportions: to 100 pounds of fish, one pound of salt to one gallon of water, to produce a saline solution, and if the onion and garlic juice is not used to its full strength as it is extracted from the vegetables, a convenient and desirable distillation may be produced by the combination of one gallon of water to five gallons of onion and garlic juice distilled in the usual and ordinary manner.

By the use of my process the action of the onion and garlic juice combined with salt, produces an effect far different from the use of salt alone, in that, particularly in the case of fish, after it has been subjected to the drying process, an attractive color results, one to be readily distinguished from that produced by the smoke and salting processes as heretofore used.

My process also preserves the fatty substances and it is comparatively inexpensive owing to the minimum amount of salt required, and produces an article which can be handled, stored and shipped to advantage and for an indefinite length of time, and which can be prepared for the table without subjecting it to a long soaking process for the purpose of removing the excessive amount of salt.

Having thus described my invention, I claim:

The process of preserving fish, fowl and animal flesh for food, which consists in dressing and cleansing the same, and while still moist, treating it with salt and onion or garlic juice, and thereafter drying the same.

L W. MANUEL.

Witnesses:
LE ROY W. FRANKLIN,
INEZ M. FORD.